United States Patent
Ptashne (10) Patent No.: US 10,274,092 B2
(45) Date of Patent: Apr. 30, 2019

(54) FLOW DIVERTER VALVE

(71) Applicant: Don Ptashne, Pasadena, CA (US)

(72) Inventor: Don Ptashne, Pasadena, CA (US)

(73) Assignee: Don Ptashne, Pasadena, CA (US)

( * ) Notice: Subject to any disclaimer, the term of this patent is extended or adjusted under 35 U.S.C. 154(b) by 0 days.

(21) Appl. No.: 15/941,523

(22) Filed: Mar. 30, 2018

(65) Prior Publication Data

US 2018/0283566 A1 Oct. 4, 2018

Related U.S. Application Data

(60) Provisional application No. 62/480,900, filed on Apr. 3, 2017.

(51) Int. Cl.
*F16K 5/00* (2006.01)
*F16K 11/07* (2006.01)
*E03C 1/08* (2006.01)

(52) U.S. Cl.
CPC ............ *F16K 11/0716* (2013.01); *E03C 1/08* (2013.01); *E03C 2201/30* (2013.01)

(58) Field of Classification Search
CPC ........ F16K 11/0716; E03C 1/08; E03C 1/084; E03C 1/086
See application file for complete search history.

(56) References Cited

U.S. PATENT DOCUMENTS

| | | | | |
|---|---|---|---|---|
| 3,669,101 A | * | 6/1972 | Kleiner | A61C 17/0214 601/164 |
| 3,682,392 A | * | 8/1972 | Kint | E03C 1/08 137/625.5 |
| 3,690,565 A | * | 9/1972 | Abos | E03C 1/046 137/625.5 |
| 4,650,470 A | * | 3/1987 | Epstein | A61M 3/025 137/625.48 |
| 5,279,329 A | * | 1/1994 | Pippel | E03C 1/023 137/625.29 |
| 5,279,593 A | * | 1/1994 | Hiltebrandt | A61B 1/00137 600/104 |
| 6,093,313 A | * | 7/2000 | Bovaird | B01D 35/04 137/551 |

(Continued)

*Primary Examiner* — Reinaldo Sanchez-Medina (57) ABSTRACT

Disclosed is a flow diverter valve. The valve includes a cylindrical valve body having a top chamber with a first opening, a bottom chamber with a second opening, wherein the bottom chamber is adapted to removably receive an aerator or similar unit for aeration and/or fluid stream shaping of fluid flowing therethrough, and an intermediate channel defining a continuous passageway between the top chamber and the bottom chambers and extending to an outlet configured adjacent to the bottom chamber forming a part of a flow channel (Channel "C"), a nut adapted for connecting the cylindrical valve body to a water outlet, and a piston assembly slidably housed within the intermediate chamber, wherein the piston assembly in an extended position defines a flow channel (Channel "B") for the fluid to flow therethrough under reduced or restricted pressure or common faucet water flow pressure, and the piston assembly in a retracted position defines the flow channel (Channel "C") for the fluid to flow therethrough under relatively higher pressure or greater intensity.

11 Claims, 9 Drawing Sheets

(56) References Cited

U.S. PATENT DOCUMENTS

| | | | | |
|---|---|---|---|---|
| 6,135,154 A * | 10/2000 | Chen | ............ | B01D 35/04 |
| | | | | 137/625.29 |
| 6,142,389 A * | 11/2000 | Kynett | ............ | E03C 1/08 |
| | | | | 239/444 |
| 6,557,587 B1 * | 5/2003 | Chiu | ............ | E03C 1/04 |
| | | | | 137/801 |
| 2011/0248202 A1 * | 10/2011 | Vidal | ............ | F16K 11/0716 |
| | | | | 251/326 |
| 2016/0103456 A1 * | 4/2016 | Cho | ............ | F16K 31/002 |
| | | | | 236/101 R |

* cited by examiner

FLOW DIVERTER VALVE

CROSS REFERENCE TO RELATED APPLICATION

The present application claims the priority benefits of U.S. Provisional Application No. 62/480,900, filed on Apr. 3, 2017, titled "FLOW DIVERTER VALVE", which is incorporated herein by reference in its entirety.

TECHNICAL FIELD OF INVENTION

The present invention relates to flow diverter valves for connection to water outlets used for household and commercial purposes such as faucets in sinks, bathtubs and showers, in order to provide water flow at reduced or restricted pressure or common faucet water flow, and relatively higher pressure.

BACKGROUND

Flow diverters are mainly attached to outlets of pressurized water systems, such as faucets in commercial and residential settings. Flow diverters provide the user with ability to change the intensity and spray pattern of the water stream from low intensity to higher intensity by redirection of the flow from one flow channel to another flow channel. Higher intensity water streams enable the effective cleaning of utensils and many other products such as dentures, toothbrushes and razors.

One such water diverter is disclosed in U.S. Pat. No. 6,142,389 to Kynett. The U.S. Pat. No. 6,142,389 discloses about a diverter valve that contains a valve body and side passage which are in selective fluid communication and essentially controlled by movement of a piston externally. Construction of the valve described in the U.S. Pat. No. 6,142,389 require independent manufacture of the valve body and the side passage unit. With the design of the valve disclosed by Kynett, it is necessary for a user to drill a hole in the valve body for insertion of the side passage. Also, as disclosed by Kynett, the side passage unit is held in place either by glue or by a threaded side passage screwed into a threaded hole in the valve body. Such design may be unfit for regular uses in both the commercial or residential settings as both the glued and threaded connections have propensity or likelihood to leak under the high pressure exerted internally within the valve body. Furthermore the side passage could potentially become loose or break off from external forces, such as being bumped by the user.

Thus, in the light of the above-mentioned background art, it is evident that, there is a need for an improved flow diverter valve that would be simple in terms of design and at the same time could overcome above said drawbacks.

BRIEF SUMMARY

Before the present systems and methods, enablement are described, it is to be understood that this application is not limited to the particular systems, and methodologies described, as there can be multiple possible embodiments which are not expressly illustrated in the present disclosures. It is also to be understood that the terminology used in the description is for the purpose of describing the particular versions or embodiments only, and is not intended to limit the scope of the present application.

It is an object of the present invention to provide a flow diverter with the valve's body hosting two flow channels, one which allows the flow of fluid through a pressure reducing aerator unit or other pressure reducing apparatus and another channel that allows the flow of fluid under an unrestricted higher pressure.

It is another object of the present invention to provide a flow diverter having watertight moving parts capable of switching between a first channel and a second channel, both configured within the body of the diverter for providing a higher pressurized jet of liquid/fluid.

It is another object of the present invention to provide a flow diverter valve suitable to accommodate an aerator unit.

Embodiments of the present invention discloses a flow diverter valve that includes a cylindrical valve body having a top chamber with a first opening, a bottom chamber with a second opening, wherein the bottom chamber is adapted to removably receive an aerator unit for aeration or stream shaping of fluid flowing therethrough, and an intermediate channel defining a continuous passageway between the top chamber and the bottom chambers and extending to an outlet configured adjacent to the bottom chamber forming a part of a flow channel (Channel "C"), a nut adapted for connecting the cylindrical valve body to a water outlet, and a piston assembly slidably housed within the intermediate channel, wherein the piston assembly in an extended position defines a flow channel (Channel "B") for the fluid to flow therethrough under restricted or reduced pressure, and the piston assembly in a retracted position defines the flow channel (Channel "C") for the fluid to flow therethrough under an unrestricted higher pressure.

According to the embodiment, the nut including a plurality of threads configured internally and/or externally that connects the nut to the water outlet such as a faucet.

According to the embodiment, the nut may be fixedly attached to the cylindrical valve body and/or may be removably attached to the cylindrical valve body.

According to the embodiment, the piston assembly comprising: a cylindrical stem with an open end, a handle end, an internal channel extending from the open end to a plurality of openings proximal to the handle end, and a first pair of raised circular members with an O-ring in between them, a second pair of raised circular members with an O-ring in between them, and a third pair of raised circular members with an O-ring in between them, all in frictional contact with the intermediate channel.

According to the embodiment, wherein the flow channel (Channel "B") is defined by interconnection of the top chamber, the intermediate channel and the bottom chamber, defined by the first opening and the second opening present in the top chamber and the bottom chamber, and in between the first pair and the second pair of raised circular members, of the piston assembly.

According to the embodiment, wherein the flow channel (Channel "C") is defined by the interconnection of the top chamber, the intermediate channel and the outlet. The interconnection between the top chamber, the intermediate channel and the outlet is supported by the first opening in the top chamber, the plurality of openings and the internal channel of the piston assembly.

Various objects, features, aspects and advantages of the present invention will become more apparent from the following detailed description of the embodiments of the invention, along with the accompanying drawings in which like numerals represent like components.

BRIEF DESCRIPTION OF THE DRAWINGS

The foregoing summary, as well as the following detailed description of preferred embodiments, is better understood when read in conjunction with the appended drawings. There is shown in the drawings example embodiments, however, the application is not limited to the specific system and method disclosed in the drawings.

DETAILED DESCRIPTION

Some embodiments, illustrating its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any methods, and systems similar or equivalent to those described herein can be used in the practice or testing of embodiments, the preferred methods, and systems are now described. The disclosed embodiments are merely exemplary.

The various features and embodiments of flow diverter valve of the present invention will now be described in conjunction with the accompanying figures, namely FIGS. 1-9

Figure 1:
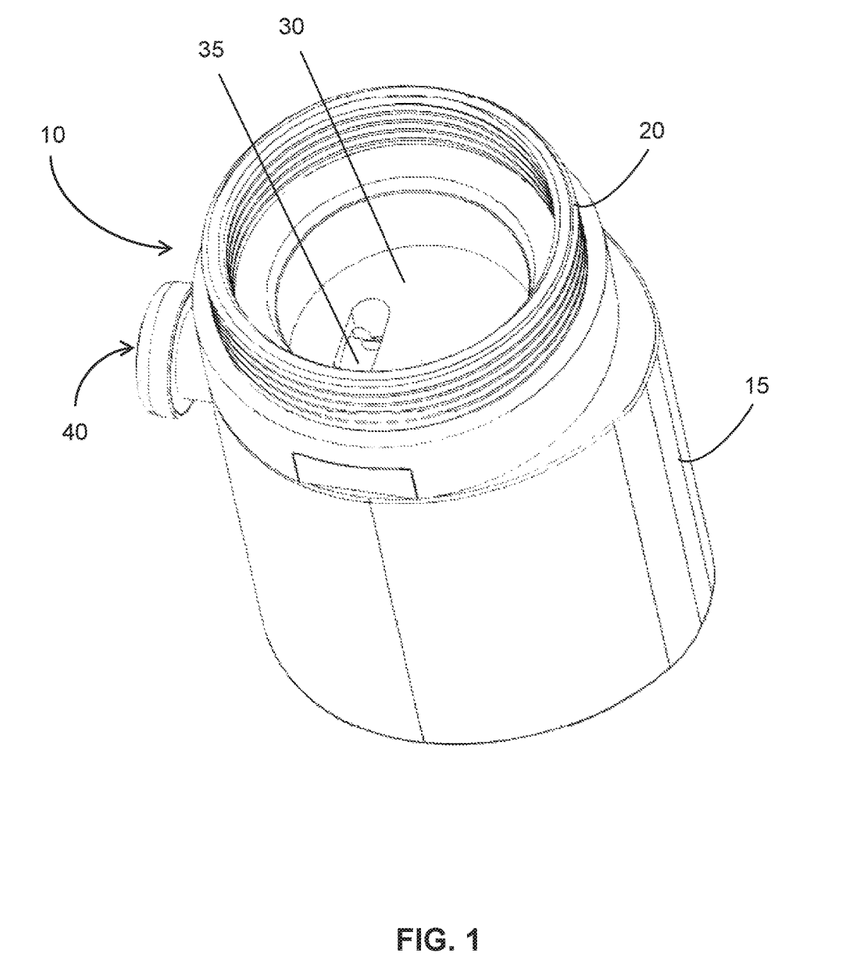
FIG. 1 illustrates a top perspective view of a flow diverter valve, according to an exemplary embodiment of the present invention.
Figure 3A:
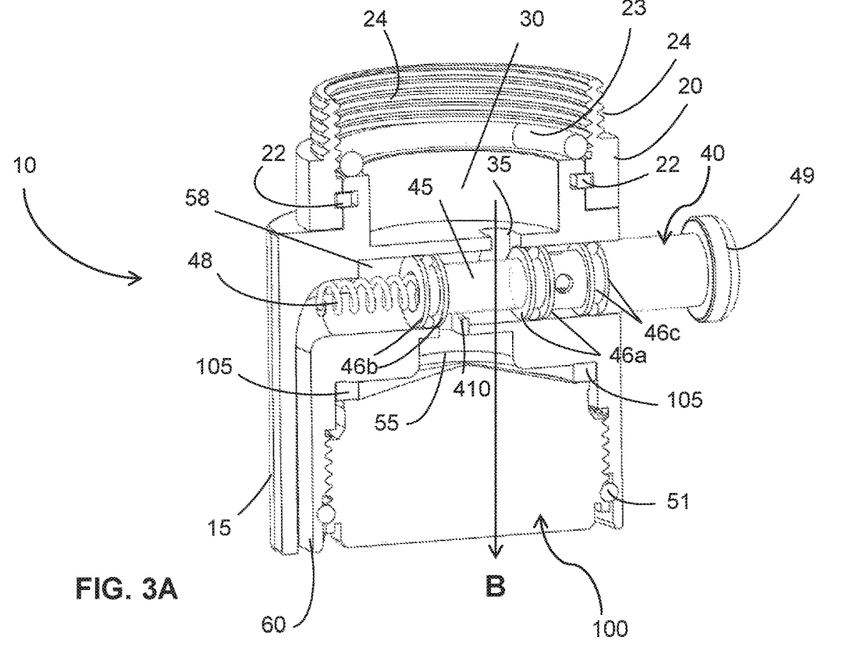
FIG. 3A illustrates a sectional view of a flow diverter valve along AA' shown in the FIG. 2B with the flow diverter operating in first channel flow mode, according to an embodiment of the present invention.

Referring to accompanying figures, especially FIG. 1 that shows a top perspective view of the flow diverter valve of the present invention. As seen, the flow diverter valve 10 consists of an upper rotatable nut 20 attached to a cylindrical valve body 15. The nut 20 is suitable for connecting to a faucet, valve or like water flow outlets commonly used in commercial and residential settings. According to embodiments of the present invention, the upper rotatable nut 20 may either be fixedly attached to the cylindrical valve body 15 or may be removably connected to the cylindrical valve body 15. When the upper rotatable nut 20 is fixedly attached to the cylindrical valve body 15 then the nut 20 may be secured on the cylindrical valve body using a retainer ring/clip 22, as shown in FIG. 3A.

Figure 7A:
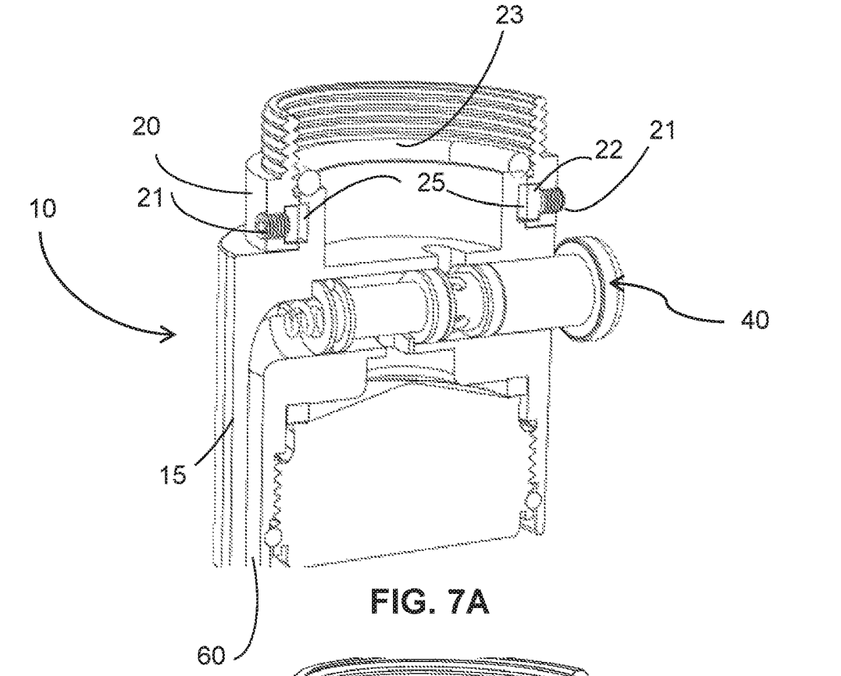
FIG. 7A-7B illustrates an alternative embodiment of the present invention.
Figure 7B:
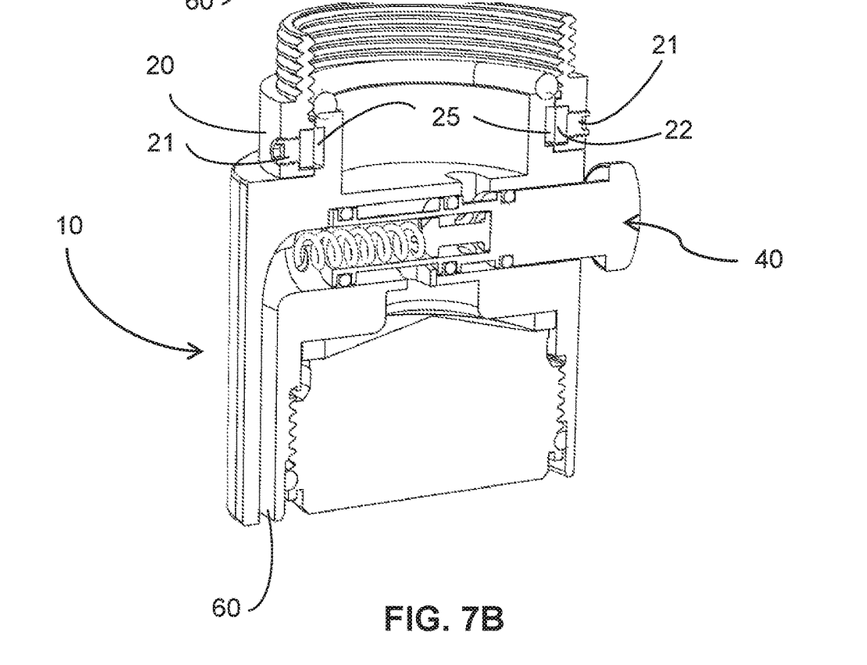
Figures 8A, 8B, 8C:
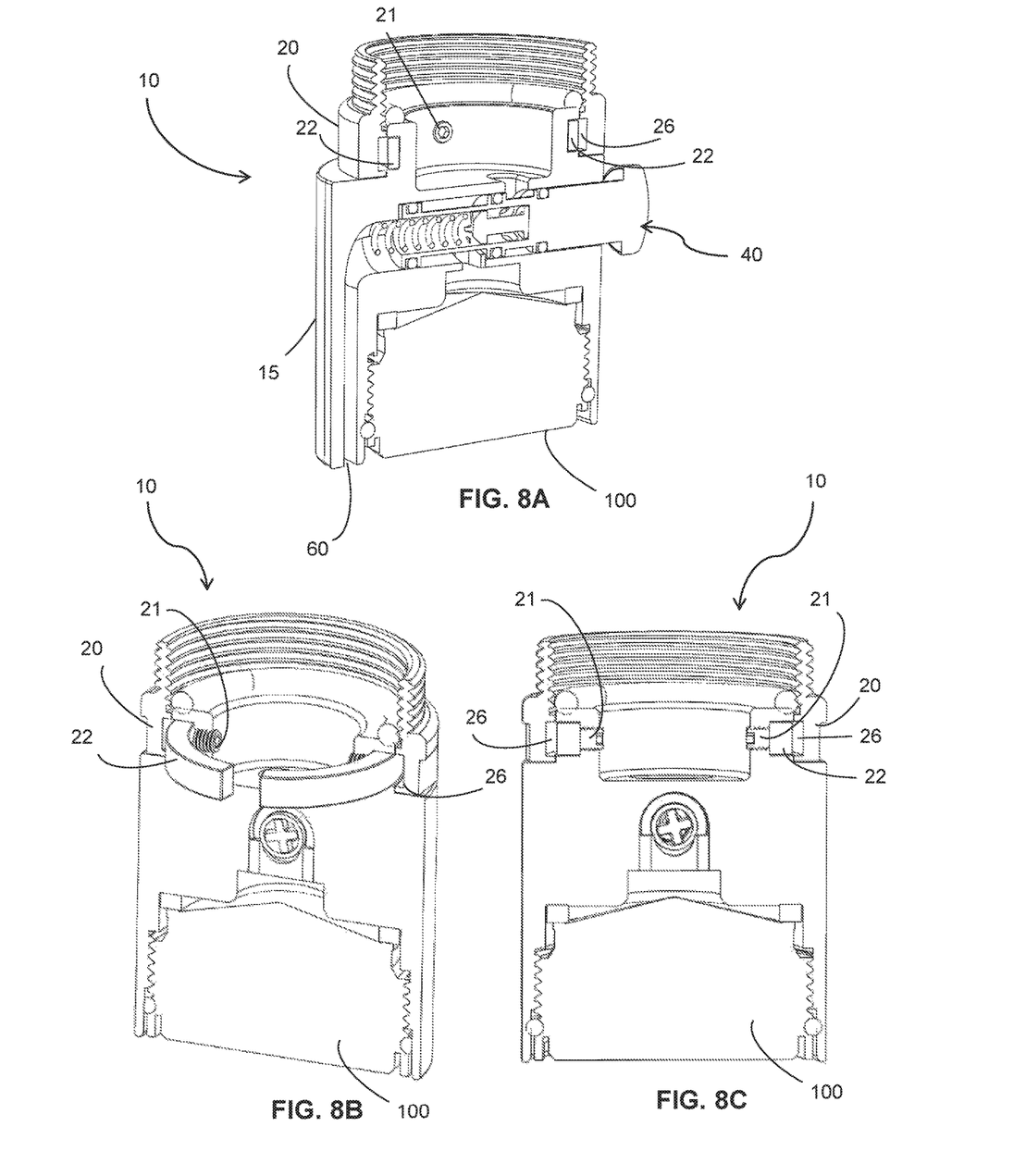
FIG. 8A-8C illustrates yet another alternative embodiment of the present invention.

Again, according to alternative embodiments, as shown in FIGS. 7A-7B, the nut 20 may be removably mounted onto the valve's body 15. As seen, the upper nut 20 may be held in place by two screws (preferably Allen screws) 21 that may be installed from outside to push the retaining ring/clip 22 into the groove 25 of the main valve body 15. Technically, the retaining ring/clip 22 in this case is spring loaded and pushes itself and holds itself into the groove 26 of the upper nut 20 and remains flush with the upper nut 20 so that the upper nut 20 can easily slide on and off the cylindrical valve body 15 until the user tightens the screws 21 which then push the retaining ring/clip 22 partially into the groove 25 of the cylindrical valve body 15. Further, unlike the mechanism for removably attaching the nut 20 with the cylindrical valve's body 15 shown in the FIGS. 7A-7B, the installation of the screws 21 may be made from the inside of the top chamber 30 that would push the retaining ring 22 partially into the groove 26 of the upper nut 20, as shown in FIGS. 8A-8C. In this case the retaining ring 22 is spring loaded around the groove 25 at the top of the cylindrical valve body 15 and fits tight and flush around the top of the cylindrical valve body 15 so the upper nut 20 can easily slide on and off the cylindrical valve body 15 until the screws 21 are tightened from inside the cylindrical valve body's top chamber 30, this pushes the retaining ring/clip 22 partially inside the groove 26 on the upper nut 20.

As seen in the FIG. 1, the cylindrical valve body 15 includes a top chamber 30 with a first opening 35, and a piston assembly 40 protruding from the external surface of the cylindrical body 15.

Figure 2A:
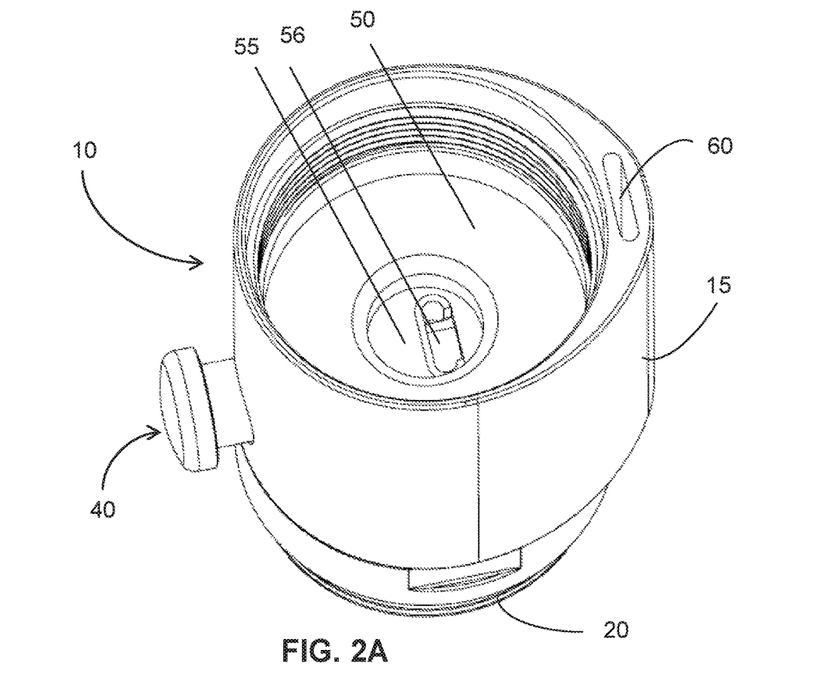
FIG. 2A illustrates a bottom perspective view of a flow diverter valve without an aerator unit, according to an embodiment of the present invention.
Figure 2B:
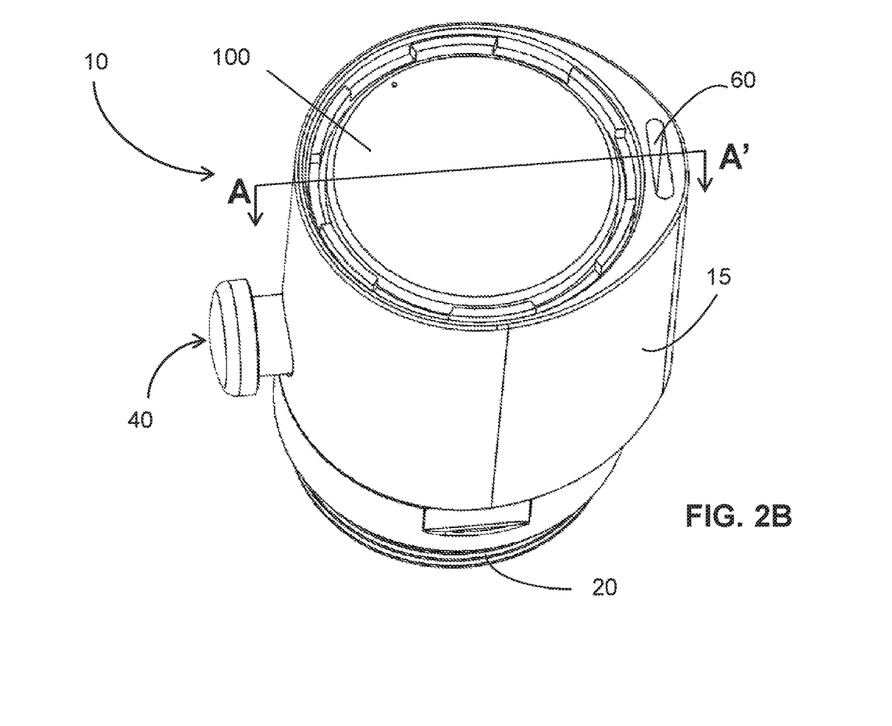
FIG. 2B illustrates a bottom perspective view of a flow diverter valve with an aerator unit, according to an embodiment of the present invention

Referring to FIGS. 2A-2B shows bottom perspective view of the flow diverter valve of the present invention. As seen, the cylindrical valve body 15 consists of a bottom chamber 50 having a second opening 55, and a third opening 56 (preferably oval in shape) and an outlet or second flow channel 60. The FIGS. 2A-2B further shows an aerator unit 100 known in the art configured within the bottom chamber 50.

Figure 3B:
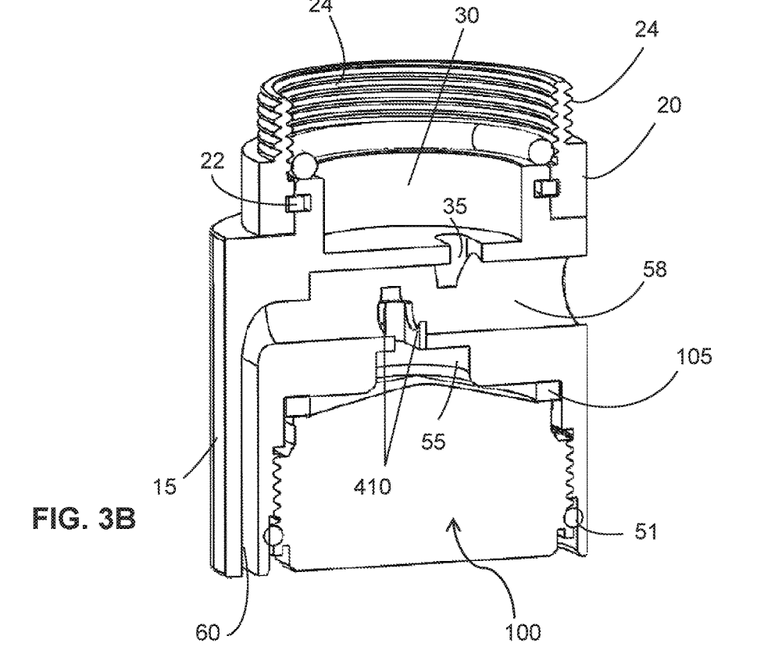
FIG. 3B illustrates a sectional view of a flow diverter valve along AA' shown in the FIG. 2B without a piston assembly, according to an embodiment of the present invention.

Referring to FIGS. 3A-3B, sectional views of the flow diverter valve 10 along AA' shown in the FIG. 2B with the flow diverter valve 10 operating in first channel flow mode is shown. FIG. 3B specifically is likely the same as FIG. 3A but without the piston assembly 40 to clearly show the intermediate channel 58. As seen, the cylindrical body 15 of the flow diverter valve 10 defines the bottom chamber 50 for mounting the aerator unit 100 therein using a washer 105 to provide a watertight connection of the aerator unit 100 within the bottom chamber 50. Further, the cylindrical body 15 in combination with the upper nut 20 also defines the top chamber 30 with the first opening 35. The upper nut 20 being freely rotational around the cylindrical body 15 to allow connection via internal and external screw threads 24 to a faucet or other plumbing outlets, and secured to the cylindrical body 15 by means of the retainer ring/clip 22 as discussed above.

Additionally, a washer 23 may also be used to provide a watertight connection between the nut 20 and the faucet or other plumbing outlet. The top chamber 30 and the bottom chamber 50 are in fluid communication with an intermediate channel 58 via first opening 35 and second opening 55 and the third opening 56. The cylindrical body 15 further includes an intermediate channel 58 that houses the piston assembly 40 shown in FIG. 4A. The intermediate channel 58 also includes a piston lock 410 (shown in FIG. 4B) configured therein to keep proper alignment of and prevent removal of the piston assembly 40 from the intermediate channel 58. The intermediate channel 58 also forms a continuous channel with the outlet or the second flow channel 60 in combination with the piston assembly 40 when the flow diverter valve 10 is made to operate in the second channel flow mode that would be described with reference to FIGS. 5-6 below.

Figure 4A:
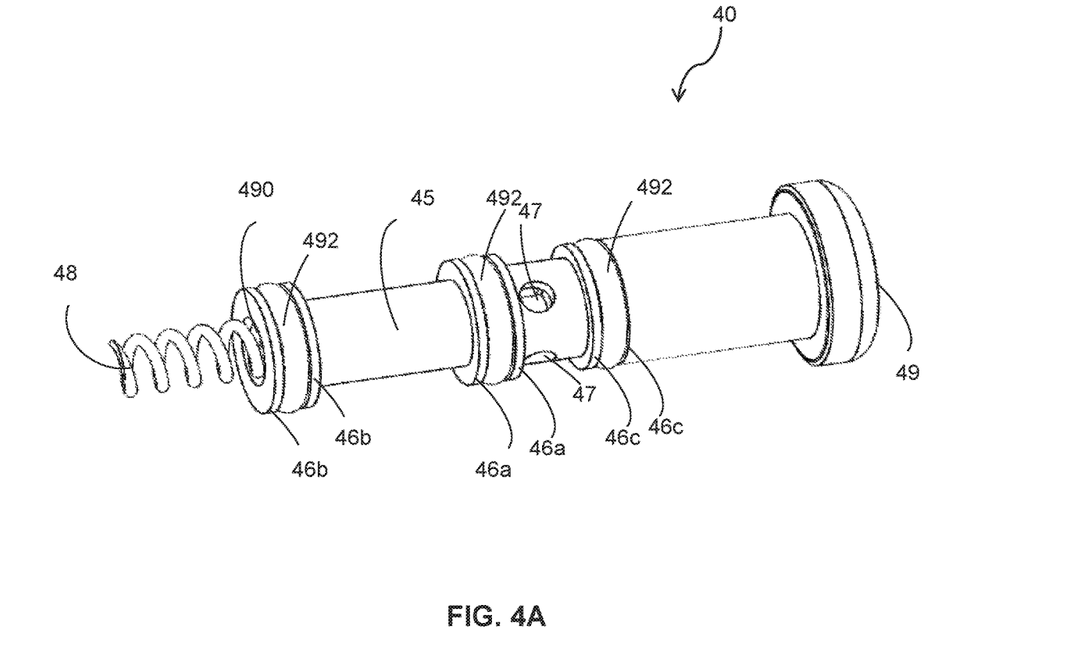
FIG. 4A illustrates the piston assembly embodied in the flow diverter valve of the present invention.
Figure 4B:
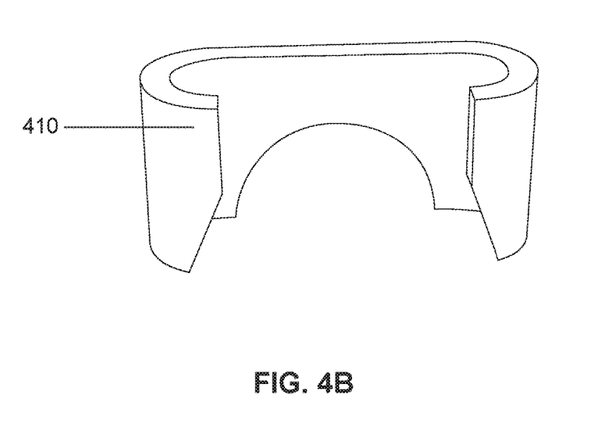
FIG. 4B illustrates a piston lock of the present invention that retains the piston assembly within an intermediate channel present in the flow diverter valve.

Referring to FIG. 4A, illustrates the piston assembly 40 embodied or housed in the flow diverter valve 10 specifically inside the intermediate channel 58. As seen, the piston assembly 40 includes a hollow cylindrical stem 45 with opposing handle end 49 and an open end 490. A spring 48 is inserted into the open end 490 of the hollow cylindrical stem 45, the channel within stem 45 being terminated via one or more openings 47 radially arranged around stem 45. The external surface of cylindrical stem 45 is divided into sections by a first pair of raised circular members 46a, a second pair of raised circular members 46b and a third pair of raised circular members 46c. Residing between the raised circular members, 46a, 46b, and 46c are O-rings 492 constructed from a suitable water resistant material such as rubber, silicone, or other suitable polymer. The O-rings 492 between the raised circular members 46a, 46b, and 46c remain in frictional contact with the internal surface of the intermediate channel 58 and define watertight, or fluid tight, sections within the intermediate channel 58.

Referring to the FIG. 3A and the FIG. 4A, a first flow channel mode of the flow diverter valve 10 is automatically selected when the piston assembly 40 is in a relaxed position or is in an extended position (when no tension force is exerted on the spring 48 of the piston assembly 40). In the first flow channel mode, the flow channel (Channel "B") for the fluid is defined by the top chamber 30, first opening 35, the section of the intermediate channel 58 and the portion of the external surface of cylindrical piston stem 45 between the first pair of raised circular members 46a, and the second pair of raised circular members 46b, and the second opening 55 leading to the lower/bottom chamber 50, all being in fluid communication. The water flow from the flow channel during the first flow channel mode may be under reduced or restricted pressure or common faucet water flow or pressure once passing through the aerator unit 100, as best shown in FIG. 9A that could be used for variety of purposes such as washing your hands or the cleaning of utensils and many other products such as dentures, toothbrushes and razors.

Figure 5:
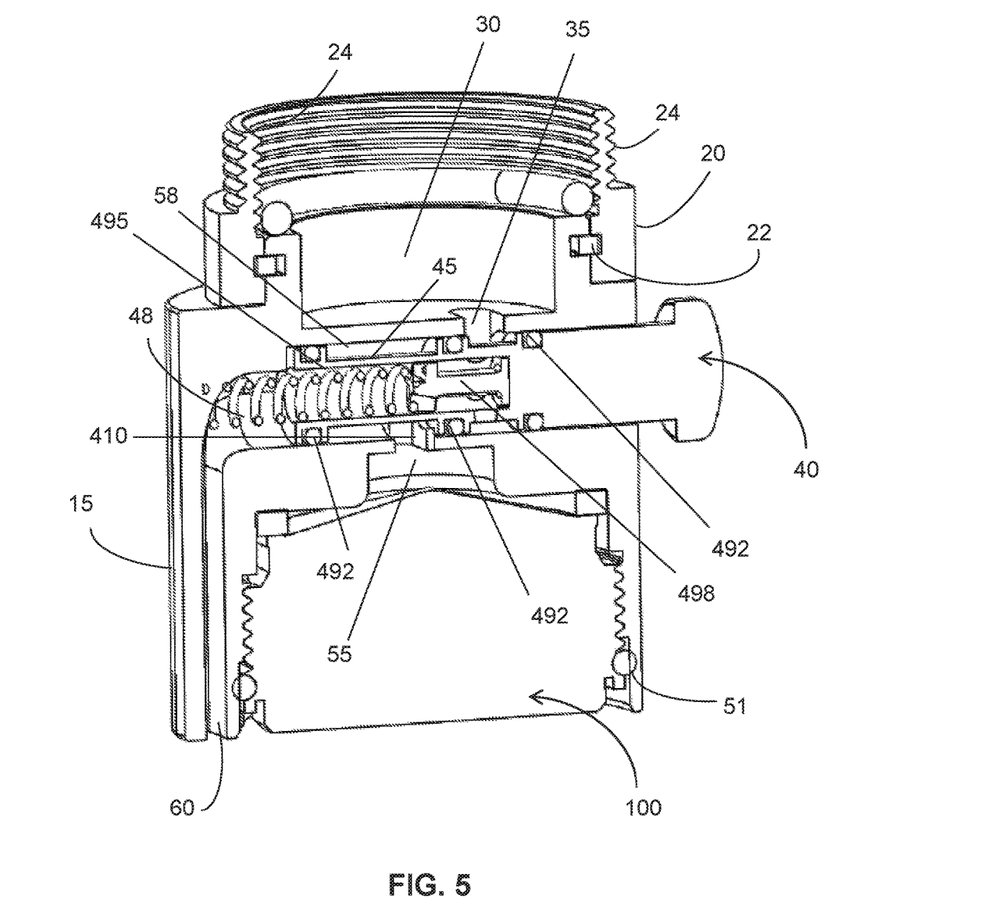
FIG. 5-6 illustrates a cross sectional view of a flow diverter valve along AA' shown in the FIG. 2B with the flow diverter operating in second channel flow mode, according to an embodiment of the present invention
Figure 6:
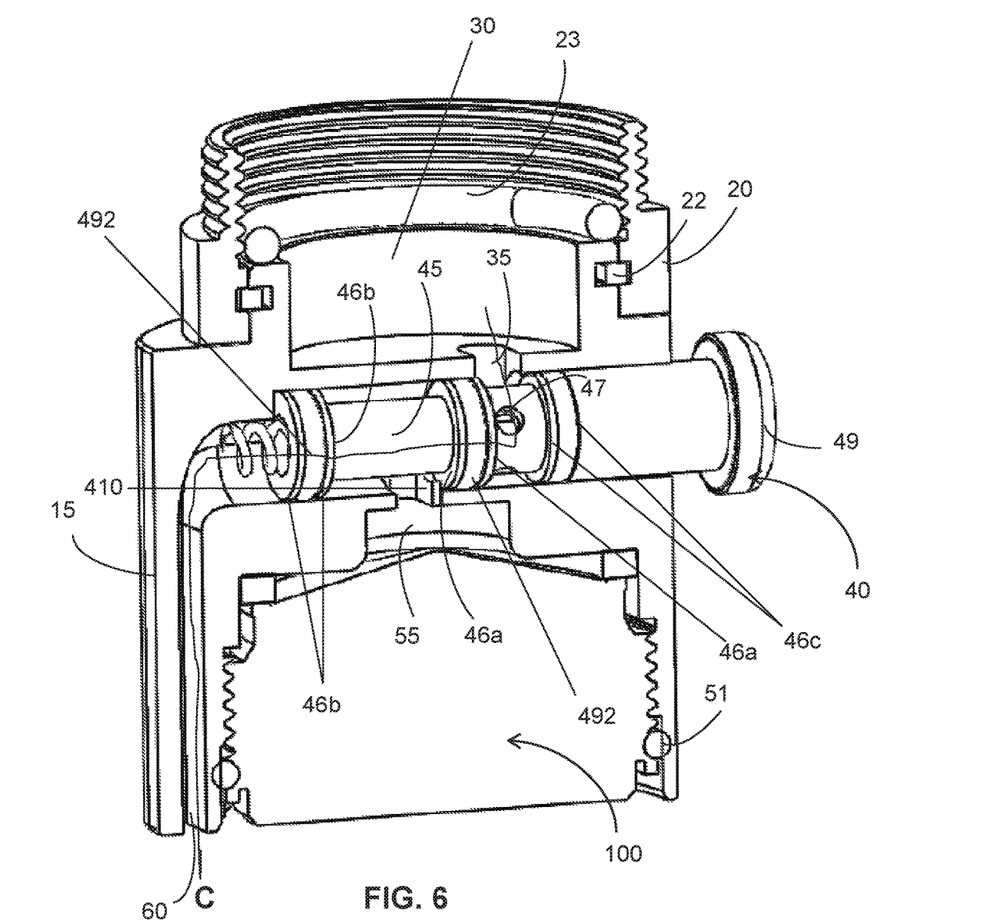

Referring to FIG. 5 and FIG. 6, a second flow channel mode of the flow diverter valve 10 is shown. During the second flow channel mode of operation, the piston assembly 40 is fully pushed in, or engaged, within intermediate channel 58. When the piston assembly 40 is fully pushed in or under stress (or the spring 48 of the piston assembly 40 experiences the tension force) then the openings 47 on the cylindrical stem 45 of the piston assembly 40 get aligned with opening 35 in the top chamber 30, thus the fluid flow channel (channel "C", as shown in the FIG. 6) takes the route of the top chamber 30, the first opening 35, the section of the intermediate channel 58 and the openings 47 present on the cylindrical piston stem 45, the hollow cylindrical channel 495 within the cylindrical stem 45, the spring 48 that abuts the internal wall of the valve body 15 and a piston pin 498 which keeps the spring 48 from blocking the openings 47 to maximize fluid output, down to the outlet or the second flow channel 60 that directs the fluid out of the flow diverter valve 10 under relatively higher pressure or increased intensity, as best shown in FIG. 9B for effective cleaning of utensils and many other products such as dentures, toothbrushes and razors.

As described above with reference to FIG. 3A and FIG. 4B, the function of the piston lock 410 is apparent. It is apparent from FIGS. 3A and 3B that the engagement of the raised circular members 46a and 46b with the piston lock 410 prevent complete disengagement or removal of the piston assembly 40 from the intermediate channel 58 and furthermore keep the piston assembly 40 in alignment. During the manufacturing process, firstly the piston assembly 40 is inserted into the intermediate channel 58 of the cylindrical body 15, then the piston lock 410 is pressed into the intermediate channel 58 though the third oval shaped opening 56 to wrap around the cylindrical stem 45 of the piston assembly 40. As mentioned the piston lock 410 resides pressed within the bottom channel 56 and sits between two pairs of raised circular members 46a and 46b of the piston assembly 40 along the cylindrical stem 45. The piston lock 410 stops the movement of the piston assembly 40 in two ways. First when the piston assembly 40 is depressed/retracted as seen in FIG. 5 one of the raised circular members of pair 46a makes contact with the piston lock and stops the piston assembly 40 from moving further into the cylindrical body 58, keeping the piston assembly 40 in correct alignment for proper fluid flow. Furthermore when the piston assembly 40 is in a neutral or non-depressed state as seen in FIG. 3A one of the raised circular members of pair 46b makes contact with the piston lock 410 and stops the piston assembly 40 from moving further out or being removed from the cylindrical body 58.

Figure 9A:
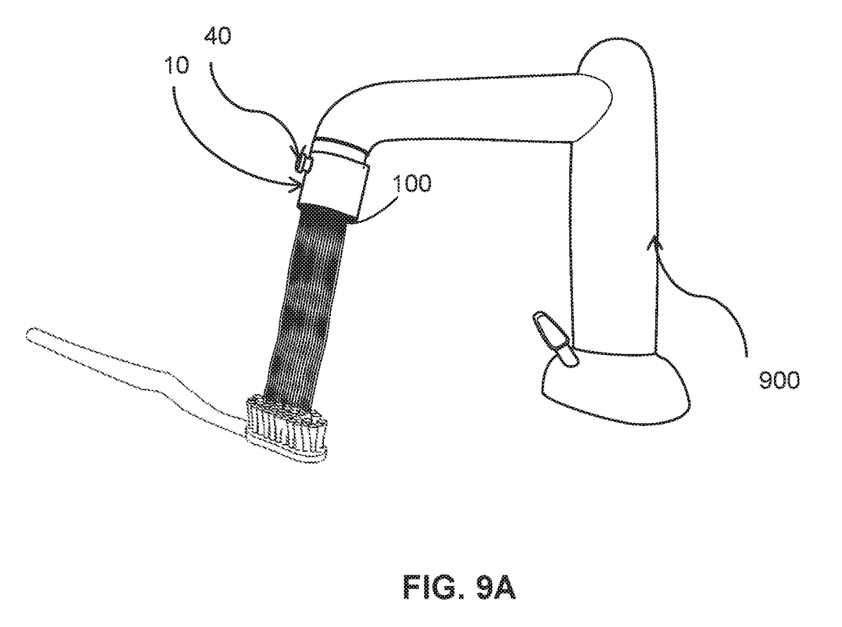
FIG. 9A-9B shows the flow diverter valve in use, according to an embodiment of the present invention.

In operation as shown in the FIG. 9A, the default or resting position of the piston assembly 40 is in a fully extended position wherein the fully relaxed spring 48 rests between and against the inner wall of the intermediate channel 58 or the cylindrical body 15 and the piston pin 498. This mode is shown and described above in relation to the FIG. 3A and defines the first flow channel (Channel "B") of the flow diverter 10 of the present invention.

Figure 9B:
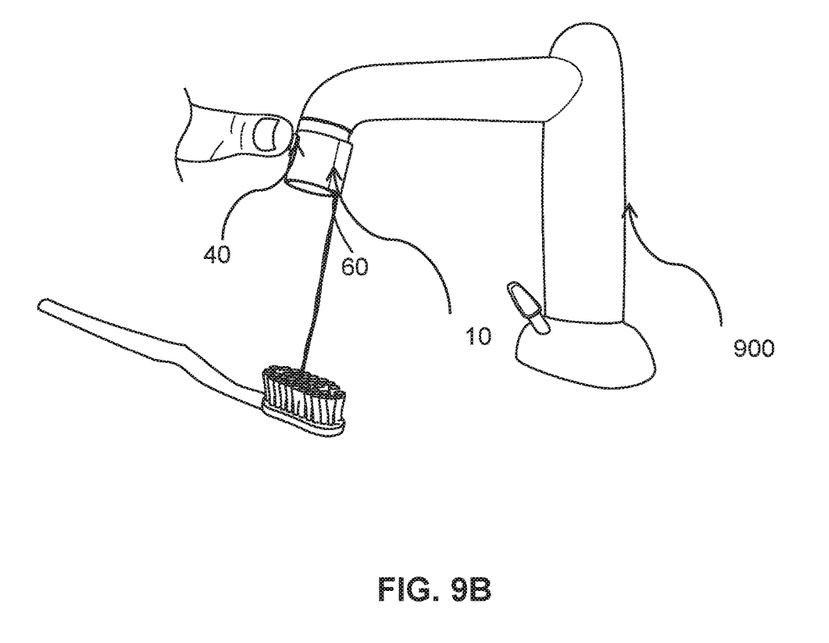

Further, in operation as shown in the FIG. 9B, upon depressing or retracting the piston assembly 40 by the user as shown and described in the FIGS. 5-6. This configuration provides the second flow channel (channel "C") defined by fluid communication of the top chamber 30, the first opening 35, the openings 47 and the hollow channel 495 of the piston stem 45 leading to the outlet 60.

It should be understood that the cylindrical body 15, the aerator unit 100, and the piston assembly 40 may be constructed from water resistant materials selected from but not limited to pewter, copper, bronze, brass, stainless steel, zinc alloys or suitable polymeric material or any combinations thereof.

In the embodiments described above it is seen that the flow diverter valve 10 of the present invention is suitable for connection via internal and external screw threads 24 to a matching thread on the faucet, valve or other plumbing connection, to provide a firm watertight connection. However, it should be understood that other connection means known in the art, or varying sizes can be substituted for the threads 24.

The user opens, or turns on the water flow through the faucet, or other like water outlets, resulting in a stream of water travelling through the first flow channel (channel "B") as described above resulting in a stream of water out of the aerator unit 100 as shown in the FIG. 9A. This is the default setting for flow diverter valve 10.

Should the user wish to obtain a higher pressurized or stronger stream of water as shown in the FIG. 9B for the effective cleaning (say for cleaning a toothbrush or razor), then the piston assembly 40 is depressed or retracted pushing the stem 45 further into the intermediate channel 58 and compressing spring 48 as shown and described in FIGS. 5-6 above. The flow of water from the faucet or water source is then directed via the second flow channel (channel "C") and out of the flow diverter valve 10 at higher pressure or greater intensity via outlet 60 until pressure is released from the piston assembly 40.

It should be understood according to the preceding description of the present invention that the same is susceptible to changes, modifications and adaptations, and that the said changes, modifications and adaptations fall within scope of the appended claims.

What is claimed is:

1. A flow diverter valve (10), comprising:
   a cylindrical valve body (15) including a top chamber (30) with a first opening (35), a bottom chamber (50) with a second opening (55), wherein the bottom chamber (50) is adapted to removably receive an aerator unit (100) or similar apparatus for aeration, flow reduction or water stream shaping of fluid flowing therethrough, and an intermediate channel (58) defining a continuous passageway between the top chamber (30) and the bottom chambers (50) and extending to an outlet (60) configured adjacent to the bottom chamber (50) forming a part of a first flow channel (Channel "C");
   a nut (20) adapted for connecting the cylindrical valve body (15) to a water outlet; and
   a piston assembly (40) slidably housed within the intermediate channel (58), wherein the piston assembly (40) in an extended position defines a second flow channel (Channel "B") for the fluid to flow therethrough under common faucet water flow, and the piston assembly (40) in a retracted position defines the first flow channel (Channel "C") for the fluid to flow therethrough under relatively higher pressure or greater intensity,
   wherein the piston assembly (40) comprises a cylindrical stem (45) with an open end (490), wherein a spring (48) is inserted into the open end (490) of the cylindrical stem (45), wherein no tension force is exerted on the spring (48) in the extended position, and the spring (48) experiences the tension force in the retracted position.

2. The flow diverter valve (10) of claim 1, wherein the bottom chamber (50) further includes a third opening (56).

3. The flow diverter valve (10) of claim 1, wherein the nut (20) including a plurality of threads (24) configured internally and/or externally that connects the nut (20) to the water outlet.

4. The flow diverter valve (10) of claim 1, wherein the nut (20) being fixedly attached to the cylindrical valve body (15).

5. The flow diverter valve (10) of claim 1, wherein the nut (20) being removably attached to the cylindrical valve body (15).

6. The flow diverter valve (10) of claim 1, wherein the piston assembly (40) comprising:
   the cylindrical stem (45) with the open end (490);
   a handle end (49);
   an internal channel (495) extending from the open end (490) to a plurality of openings (47) proximal to the handle end (49); and
   a first pair of raised circular members (46a) with an O-ring (492) in between, a second pair of raised circular members (46b) with an O-ring (492) in between, a third pair of raised circular members (46c) with an O-ring (492) in between, wherein the O-rings (492) maintain frictional, water tight contact with the intermediate channel (58).

7. The flow diverter valve (10) of claim 6, wherein the first pair of raised circular members (46a), the second pair of raised circular members (46b) and the third pair of raised circular members (46c) are part of the piston assembly (40) and used to retain the O-rings (492) each of which reside in between the pair of raised circular members (46a-46c).

8. The flow diverter valve (10) of claim 7, wherein the second flow channel (Channel "B") is defined by interconnection of the top chamber (30), the intermediate channel (58) and the bottom chamber (50), defined by the first opening (35) and the second opening (56) present in the top chamber (30) and the bottom chamber (50), and between the first pair of raised circular members (46a), the second pair of raised circular members (46b) of the piston assembly (40) along the cylindrical stem (45).

9. The flow diverter valve (10) of claim 1, wherein the first flow channel (Channel "C") is defined by interconnection of the top chamber (30), the intermediate channel (58) and the outlet (60).

10. The flow diverter valve (10) of claim 6, wherein the interconnection between the top chamber (30), the intermediate channel (58) and the outlet (60) is supported by the first opening (35) in the top chamber, the plurality of openings (47), and the internal channel (495) of the piston assembly (40).

11. The flow diverter valve (10) of claim 1, wherein the cylindrical valve body (15), the aerator unit (100), and the piston assembly (40) may be constructed from water resistant materials selected from a group of pewter, copper, bronze, brass, stainless steel, zinc alloys or suitable polymeric material or any combinations thereof.

* * * * *